United States Patent [19]

Watts

[11] Patent Number: 4,813,717

[45] Date of Patent: Mar. 21, 1989

[54] OILWELL TUBING CONNECTION

[76] Inventor: John D. Watts, P.O. Box 79466, Houston, Tex. 77279

[21] Appl. No.: 897,069

[22] PCT Filed: Feb. 19, 1985

[86] PCT No.: PCT/US85/00260
§ 371 Date: Jul. 18, 1986
§ 102(e) Date: Jul. 18, 1986

[87] PCT Pub. No.: WO86/03275
PCT Pub. Date: Jun. 5, 1986

[30] Foreign Application Priority Data

Mar. 11, 1985 [CA] Canada ................................ 476205

[51] Int. Cl.[4] ............................................ F16L 25/00
[52] U.S. Cl. ...................................... 285/333; 285/397
[58] Field of Search ............... 285/333, 334, 355, 390, 285/397; 403/343

[56] References Cited

U.S. PATENT DOCUMENTS

| | | | |
|---|---|---|---|
| 1,562,373 | 11/1925 | Sheldon | 285/383 X |
| 1,703,232 | 2/1929 | Gray et al. | 285/390 X |
| 1,932,427 | 10/1933 | Stone | 285/334 |
| 2,094,491 | 9/1937 | Janata | 285/333 |
| 3,572,771 | 3/1971 | Redwine | 285/333 X |
| 4,508,375 | 4/1985 | Patterson | 285/334 |

Primary Examiner—Dave W. Arola

[57] ABSTRACT

A connection (20) for oilwell tubing and the like is disclosed which has the same outer diameter (21) as does the tubing joints (8 and 9) that it connects. Tubing joints are formed internally with a tapered thread (6 and 7) having a loadbearing flank angle (75° or more) that negates pullout tendency. A mating coupling (2) having external threads (3 and 4) may be provided with a bore 10 so as to clear a driftbar. Coupling (2) may be provided with bore (13) extending from (14 to 15) so as to develop substantially, a 100% joint strength.

19 Claims, 2 Drawing Sheets

OILWELL TUBING CONNECTION

This application is a continuation-in-part of prior application PCT/US84/01936, filed Nov. 23, 1984, hereafter abandoned.

TECHNICAL FIELD

The outer diameters of conventional threaded pipe couplings are substantially greater than the outer diameter of the pipe joints that they connect and the same is true for most strings of casing and tubing installed within oilwells, however, several constraints are presented by oilwells that are not normally present in surface piping systems. Each consecutive string including couplings, must pass within a hole bore diameter established by a drill or by a previously set string of pipe. Additionally, there must be sufficient clearance between that bore and the maximum diameter of the string being run so as to lower freely without sticking and to allow sufficient flow area through the annulus then formed for fluids without causing an unacceptable pressure drop caused by friction of the flowing fluid. Thirdly, oilwell strings must withstand axial tension and compression loads caused by the weight of miles of pipe that may be hanging within the well. Further, oilwell strings may be subject to external fluid pressures being greater than internal pressures to thereby introduce tendency to collapse. For these and other reasons, joints with upset ends and high cost "premium connections" have been introduced to work in the presence of such constraints. However, such solutions result with the outer diameters of connections being greater than the outer diameter of the pipe joints that they connect. There do exist, connections for pipe not having upset ends wherein one end of a joint is threaded externally and the other end is threaded with a mating internal thread such that joints can be screwed together to result in a connection with an outer diameter no larger than the pipe mid-section. However, such joints such as Hydril FJ Premium tubing connections enjoy only 42% axial tension strength as compared to the unthreaded pipe wall, about the same as non-upset API tubing connections. Presently, due to diameter constraints, a typical oilwell pipe program may be: 5½ OD ×2⅜ OD ×1.6 OD. To be far more advantageous for use as disclosed in my co-pending application filed herewith and entitled "Method and Means to Pump a Well," a 2⅞ OD ×1.6 OD ×1.05 OD can often make an installation possible due to clearance or cost reasons that the typical program above could not and in every case, a less expensive and a more efficient installation should result. Many tons of steel per oilwell may therefore be saved from waste. When a pipe having no reduced wall thickness contains fluid pressure, the axial stress within that wall caused by fluid pressure is approximately one-half of the circumferential stress within that wall caused by the same pressure and therefore a like amount of mechanical axial stress may be applied by pipe weight or the like, without the axial stress exceeding the circumferential stress. Reduction of the pipe wall thickness as by a thread formed on a joint of non-upset pipe, will therefore reduce still further, the magnitude of axial stress that may be dedicated to support pipe weight.

There is therefore a substantial need for a flush joint tubular connection having a higher efficiency with no loss of the connection's ability to seal against fluid pressure.

BACKGROUND ART

A flush joint tubular connection has inner and outer diameters substantially the same as the tubing joints which the connection connects.

A flush joint tubular connection made by the Hydril Co., and covered by numerous patents comprise a first straight thread, a second straight thread of sufficient diameter to pass within the bore of the first thread and a tapered mating seal between the two joints of tubing which is a premium joint of high cost and according to published data, enjoys only 42% axial strength with regard to the pipe wall.

Standard A.P.I. non-upset tubing connections comprise couplings having outer diameters considerably larger than the pipe outer diameter but still only enjoy approximately 42% efficiency as above. A.P.I. does list a "turned down" collar outer diameter to increase clearance between strings, however, the "turned down" diameter still exceeds substantially, the pipe outer diameter.

No prior art discloses a flush joint tubular connection having tapered threads, that when properly assembled, effects optimum stresses within the small end of the external thread and within the large end of the internal thread so as to provide a connection of maximum efficiency. Conventional pipe connections have threads with like tapers and result in a constant diametrical interference along the taper between the external and internal threads, thereby causing excessive stresses or requiring increased wall thickness at the end of the pipe. Excessive stresses reduce the joint strength and an increased wall thickness rules out a flush joint connection.

It is therefore clear that a flush joint connection having a high efficiency as provided by the instant invention is needed for use within oilwells and other pipe assemblies wherein radial clearance is limited.

Coberly U.S. Pat. No. 3,005,414 requires a tubing string to convey fluid power to a downhole pump, a string to convey exhausted power fluid from the downhole pump to the surface and a third string to convey well fluid from the pump to the wellhead. He depicts three parallel strings set within a large casing and makes no mention of the use of flush joint pipe run concentrically.

DISCLOSURE OF INVENTION

The present invention provides a connection for non-upset joints of oilwell tubing or the like, having a tubular coupling formed with tapered external threads thereon for mating with tapered internal threads formed within the ends of the non-upset tubing joints to be connected.

The coupling may be formed of a material having a higher strength than the material from which the tubing joints are formed so as to allow higher circumferential stresses within the small end of the male threads which is of a thinner wall than the tubing wall thereby adjacent, so as to provide a higher sealing force between the mating threads in the primary seal area. The use of higher strength material for the coupling also provides a higher axial load capacity than would be provided should the male thread be formed on the tubing joint and increases wear life due to the higher hardness.

So as to avoid the pullout tendency inherent in a non-upset tubing thread having conventional 60° thread flanks with respect to the tubing axis, a thread form is provided that has a load bearing flank angle of 75° or more, the optimum angle depending on such factors as the pipe diameter, the wall thickness and the material strength.

As taught by my series of patents beginning with U.S. Pat. No. 2,766,829 which have enjoyed worldwide commercial success for over 30 years in the oilfield, th space industry and the nuclear industry, the taper of the external thread is formed at a lesser angle than the taper of the internal thread so as to ensure a maximum primary sealing tendency at the smallest possible pressure area so as to minimize the axial load imposed on the connection due to internal fluid pressure. The present invention utilizes this feature in combination with other features.

Accordingly, initial thread engagement occurs on the external thread at the small end only, simultaneously as a radially spaced relationship exists between the internal and external threads elsewhere. As the connection is tightened toward full makeup, thread contact increases progressively from the small end toward the end of the tubing joint. The threads may be dimensioned such that at full make up, the threads at the larger end are in contact and the circumferential stresses within the tubing joint are less than the circumferential stresses within the small end of the male thread, ideally in proportion to their respective yield strengths.

The use of flank angles that reduce pullout tendency also allows the use of shallower threads such as a thread depth of 0.030" instead of thread depths as used by A.P.I., i.e., 0.0556" for 10 round threads and 0.0712" for 8 round threads for conventional tubing connections. In turn, the shallower thread depth allows for a higher connection efficiency because a smaller portion of the coupling wall is removed to form the thread and thereby, a thinner coupling wall may be used which, in turn, improves radial clearance of the connection and, in turn, makes possible a high efficiency flush joint connection.

So as to preclude excessive circumferential stresses of one cooperating threaded member before full makeup of the two, the wall thickness of the two near the small end of the engaged threads may be dimensioned inversely proportional to the strengths of the materials of each. Since moduli of elasticity is substantially the same for both members, both members will therefore be stressed to substantially the same percentage of their respective material strengths.

Should the innermost diameter of the connector be of prime importance, the coupling bore may be dimensioned slightly larger than the standard drift diameter for that size tubing, to result in a short coupling as may provide, for instance, a 75% connector efficiency. However, should axial joint strength be of prime importance, the coupling bore may be dimensioned slightly smaller than the standard drift diameter, to result in a long coupling as may provide a connector of 95 to 100% efficiency. The internal thread within the tubing joint may be formed of sufficient dimension to receive either coupling to thereby add versatility by selection of couplings at the time of use. For instance: short couplings may be used in the lower portion of a string so as to provide maximum internal clearance and thereby reduce flow resistance; long couplings may be used in the upper portion of a string so as to provide greater axial strength as required by higher axial loads due to weight of the string; all with use of like tubing joints.

The coupling may be provided with a shoulder to abut the end of the tubing joint upon full makeup, should conditions require precise makeup lengths, higher torque capacity or greater bending strengths.

DETAILED DESCRIPTION OF THE INVENTION

Figures 1, 2, 3:
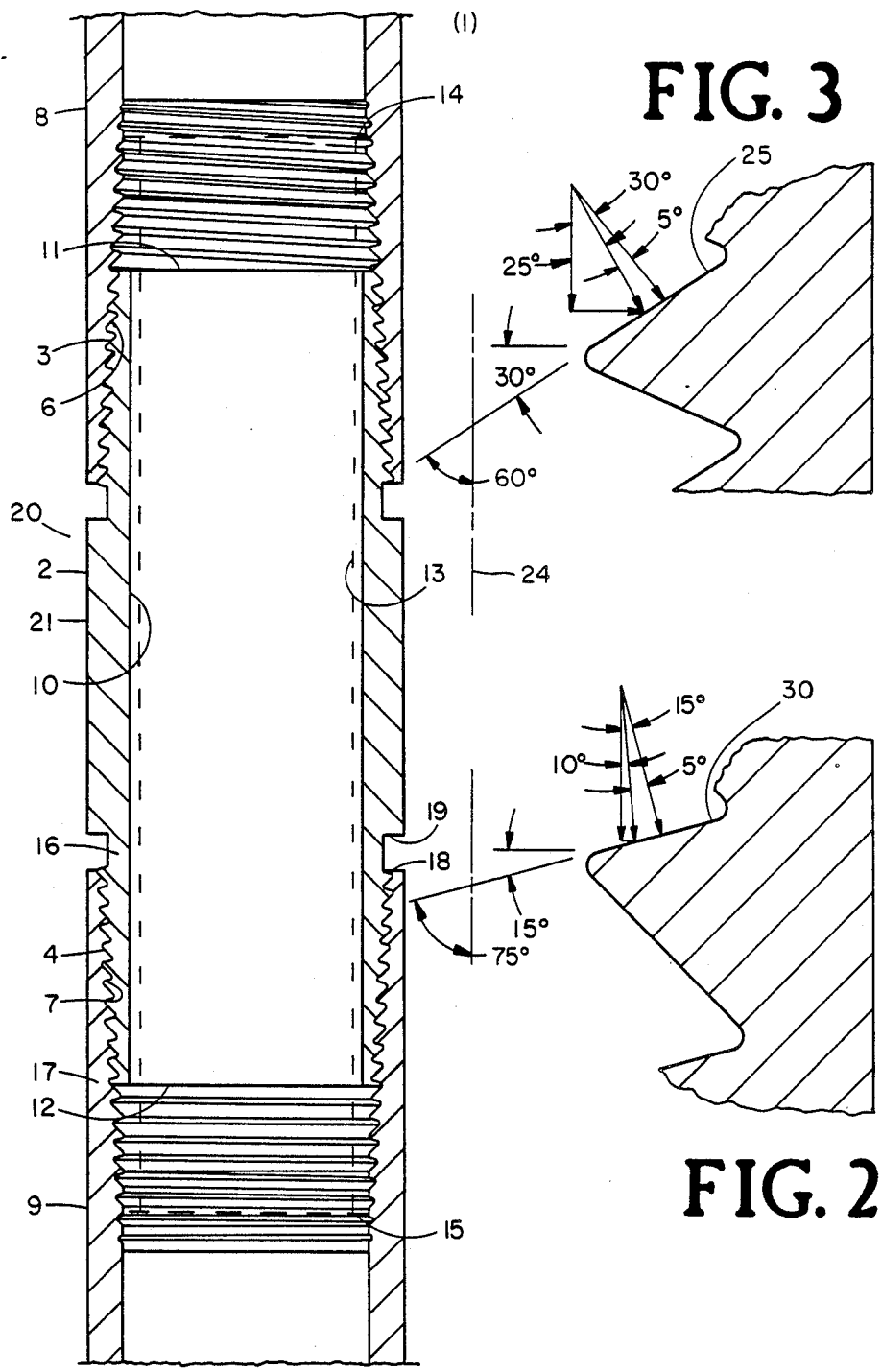
FIG. 1. depicts a vertical section of a connector in accord with the present invention.
FIG. 2. illustrates a thread form in accord with the present invention.
FIG. 3. illustrates a thread form in accord with conventional tubing joint threads.
Figure 4:
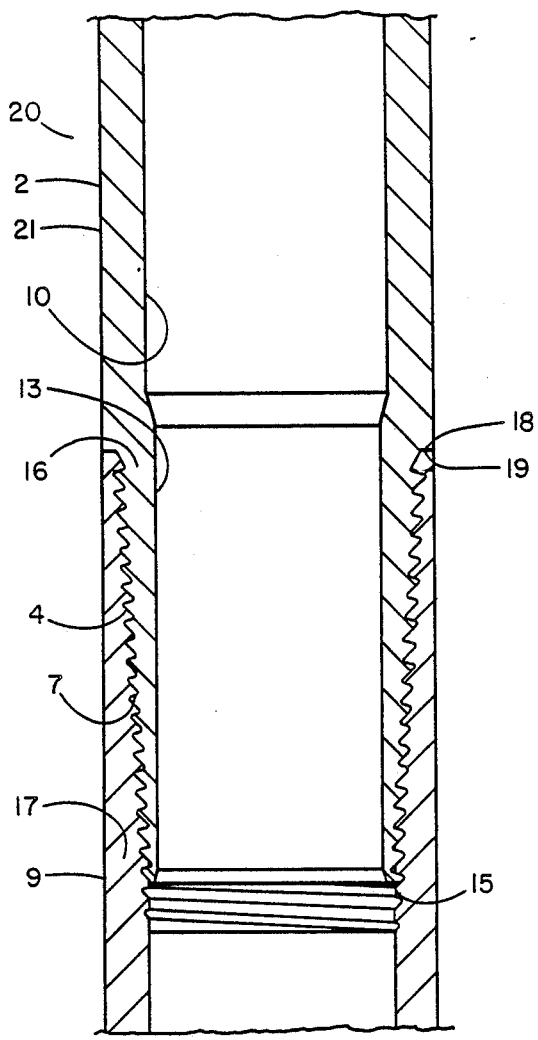
FIG. 4 illustrates a thread form which allows shoulder abutment upon makeup.

FIG. 1 depicts tubular connection shown generally at 20 comprising coupling 2 with tapered external threads 3 formed on an upper portion and having like threads 4 formed on a lower portion, so as to mate in sealing engagement with tapered internal threads 6 and 7 formed within joints of non-upset tubing 8 and 9, respectively, to be connected.

Coupling 2 may comprise inner diameter 10, upper end surface 11 and lower end surface 12, said end surfaces not extending for the full length of internal threads 6 and 7, when it is desired to have a connection with an inner diameter that will pass the industry standard "drift bar" for that size tubing. Such a connection, as limited by the tension area resulting between the root diameter of the last engaged thread as at 12, and the tubing outer diameter, may provide an axial tension strength in excess of three fourths of the pipe wall strength, effecting an efficiency greater than 75%.

Should a connection having a still higher axial strength be required, coupling 2 may be formed with inner diameter as at 13, upper end surface as at 14 and lower end surface as at 15. The coupling thereby extending for substantially the full effective length of the internal threads so as to provide a connection having an axial strength substantially equal to the pipe wall strength to thereby approach 100% efficiency.

Since typical tubing joints have lengths of sixty times or more the lengths of couplings that connect them, the couplings may be formed of material much stronger than the material the joints are formed of without causing significant increase of cost for the entire string. The use of higher strength material for the coupling 2 makes possible a higher axial strength for the connection 20 because, the strength of the coupling at neck section 16 is increased and because, collapse resistance of the pipe end as at 12 is increased to thereby increase the pullout strength also. To further increase the pullout strength of the connection, a thread form having a load bearing flank formed at 75% with respect to the tubing axis as depicted in FIG. 2, may be used for the mating threads as opposed to the most common thread form used on oilwell tubulars, depicted in FIG. 3. The form of FIG. 3 has a loadbearing flank 25 which effects an angle of 60° with the tubing axis 24. Assuming an angle of friction of 5%, elementary vector analysis will show that the form depicted in FIG. 2 results in a pullout strength of 2½ times that of FIG. 3. Reduction of the flank angle still further, can virtually eliminate tendency to pullout.

So as to ensure a seal diameter for the connection of least diameter and therefore the least axial fluid load, the taper of the external thread may be made slightly less than the taper of the internal thread. Such a condition also allows maximum radial compression of the coupling as at end surface 12 adjacent pipe joint wall as at 17 which may be formed thicker than the adjacent coupling wall. Thus, upon makeup, end 12 will compress more than wall 17 expands due to the difference in thicknesses, the moduli of elasticity being considered substantially the same. Since coupling 2 may be made of higher strength material than tubing joints 8 or 9, the thickness may be dimensioned such that stresses in walls at 12 and 17 are substantially at the same percentage of the yield strength of the materials of which the members are formed.

When the taper of the external thread is made less than the taper of the internal thread, initial contact between the two occurs only at the small end as at 12 with the internal thread as at 17. Upon continued makeup, thread contact progresses toward the larger end of the tapers to cause full engagement of the threads as at 18. A slight amount of further makeup may cause a predetermined magnitude of circumferential stress within the end of the tubing joint as at 18 and thereby establish a position of full makeup, so as to cause: compressive circumferential stresses within end 12 to be at a first desired value, simultaneously with tension circumferential stresses within the tubing joint wall between 17 and 18 being at a second desired value, less in magnitude than said first value. Said desired values may be set at the same percentage of the unit yield strengths of the respective materials to thereby effect a maximum strength for the connection.

So as to substantially effect the desired stress values, I have developed the following formulas for a given set of conditions, as an example:

FT# Hand Tite Torque = $14.5 (W D)^{\frac{1}{2}}$

Additional Power Tite Turns = $PDY/3700$

Initial Taper of External Thread = $T - 18DY/EL$ = inches/ft. on dia.

where:
W = pipe wall thickness, inches
D = pipe outside diameter, inches
Y = pipe unit yield strength, psi
Coupling Unit Yield Strength = 1.45 Pipe Unit YIeld Strength
T = Initial internal thread taper inches/ft. on dia.
L = length of thread engagement, inches
P = thread lead, inches
E = modulas of elasticity Connection 20 may comprise shoulder 18 formed on the end of joint 9 and shoulder 19 formed on coupling 2 intermediate thread 4 and the outer diameter 21 of coupling 2. The mating threads may be dimensioned so as to makeup as shown in FIG. 1 or should greater bending strength or greater tortional strength be desired, the mating threads may be dimensioned and given closer tolerances so as to allow shoulders 18 and 19 to abut upon makeup.

I claim:

1. The combination of a connection for joints of oilwell tubing or the like, comprising: a tubular coupling formed with tapered external threads thereon at each end for sealing engagement with tapered internal threads formed within the ends of the tubing joints to be connected, the connection being dimensioned and made of suitable material such that at full make-up, circumferential stresses within the small end of the external thread and within the large end of the internal thread are substantially at the same percentages of the yield stresses of the respective materials from which the joints and couplings are formed.

2. A high efficiency connection for joints of oilwell tubing or the like, comprising: a joint of pipe having no increase in wall thickness near the ends thereof, formed at each end with tapered internal threads; a tubular coupling formed at each end with tapered external threads for sealing engagement with said internal threads so as to connect two joints of pipe together, the threads being of sufficient length and taper such that the pipe wall strength in the area of the smallest diameter of thread engagement being at least; three-fourths of the nominal pipe wall strength.

3. The invention of claim 2 further comprising: the coupling being formed with a shoulder so as to abut the end of the pipe joint upon full make-up of the connection.

4. The invention of claim 3, further comprising: the threads and shoulders being dimensioned such that circumferential compressive stresses at the small end of the male thread are substantially near the unit yield strength of the material from which the coupling is formed.

5. The invention of claim 1 wherein the inner diameter of the coupling is greater than the drift diameter of the pipe.

6. The invention of claim 2 further comprising: a neck at the base of the external thread being formed with a cross-section wall area less than the nominal cross-section wall area of the pipe; the coupling being formed of a material sufficiently stronger than the pipe material such that the external thread of the coupling can contract further than it could were it made of the pipe material, so as to effectively seal a higher fluid pressure.

7. The invention of claim 1 further comprising: the coupling being formed with a bore of smaller dimension than the pipe bore.

8. The invention of the claim 2 further comprising: the coupling being formed of a material having greater strength than the pipe material such that the combined wall strength through the connection effects a greater collapse resistance than does the pipe wall.

9. The invention of claim 8 wherein the collapse resistance of the connection is sufficiently greater than the collapse resistance of the pipe wall such that neck-down and failure of the unthreaded pipe wall will occur before failure of the connection will occur upon the application of increasing tension loads to an assembled connection.

10. The invention of claim 9 further comprising: the pipe wall area at the last engaged thread being less than the nominal pipe wall area, neck-down and failure not occurring at the last engaged thread because of said greater collapse resistance.

11. The invention of claim 1 further comprising: the external thread being formed on a taper of smaller included angle that is the taper of the internal thread such that at full make-up of the connection, a first predetermined circumferential stress is effected in the coupling at the smallest diameter of the external thread and a second predetermined circumferential stress of less magnitude than the first stress is effected in the pipe wall at the largest diameter of thread engagement.

12. The invention of claim 11 wherein make-up of the connection comprises: first contact between the external thread and the internal thread at the smallest diameter of the external thread; at full make-up of the connection, full engagement of the external threads is effected.

13. The invention of claim 1 wherein the threads are formed with load flanks and stab flanks, comprising: the load flanks being formed at an angle of 75% or greater with respect to the tubular axis; the stab flank being formed at an angle of lesser degree with respect to the tubular axis; the load flanks and the stab flanks being connected at the roots and crests by cooperating radii such that upon full make-up of the connection, increased sealing engagement is effected along the full thread engagement length.

14. The invention of claim 2 wherein the internal threads extend substantially to the pipe bore.

15. The invention of claim 1 wherein: the strength of the pipe wall at the thread root adjacent the last engaged thread toward the smaller diameter end of the taper is greater than 75% of the pipe wall strength at mid-section of the pipe so as to provide a high strength connection for non-upset pipe.

16. The invention of claim 1 wherein: the wall strength of the pipe at the thread root adjacent the last engaged thread toward the smaller diameter end of the taper is substantially equal to the pipe wall strength at mid-section of the pipe so as to provide a connection strength greater than the pipe strength.

17. The invention of claim 2 wherein the thread depth is less than one-sixth of the pipe wall thickness.

18. A high efficiency connection for joints of oilwell tubing or the like, comprising: at least two pipes joined together and forming joints of pipe, each joints of pipe having a first end with no increase in wall thickness relative to the average pipe wall thickness and formed with tapered internal threads; the joints each having a second end formed with tapered external threads dimensioned such that one such joint may be sealingly connected directly with another such joint; the threads being of sufficient length and taper such that the pipe wall strength of the first end in the area of the smallest diameter of thread engagement is at least three-fourths of the average pipe wall strength of the joints of pipe.

19. The connection of claim 18 wherein: the second end is formed with a bore diameter through the external threads of smaller dimension than the average bore of the pipe.

* * * * *

UNITED STATES PATENT AND TRADEMARK OFFICE
CERTIFICATE OF CORRECTION

PATENT NO.  : 4,813,717
DATED       : Mar. 21, 1989
INVENTOR(S) : John Dawson Watts It is certified that error appears in the above-indentified patent and that said Letters Patent is hereby corrected as shown below:

On title page, item [30] insert:

--PCT/US84/01936     11-23-84--

Signed and Sealed this

Seventh Day of June, 1994

*Attest:*

BRUCE LEHMAN

*Attesting Officer*    *Commissioner of Patents and Trademarks*